UNITED STATES PATENT OFFICE.

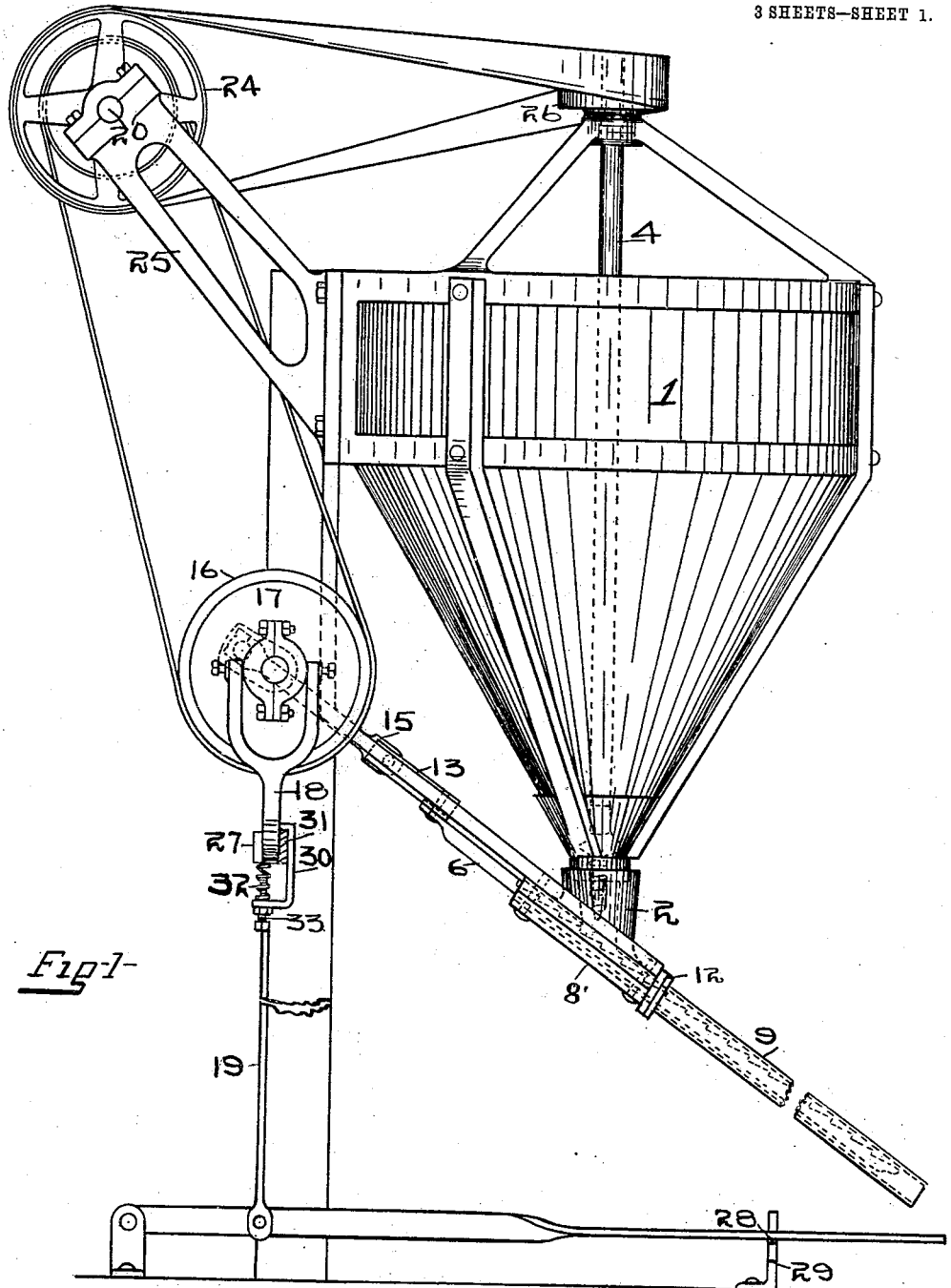

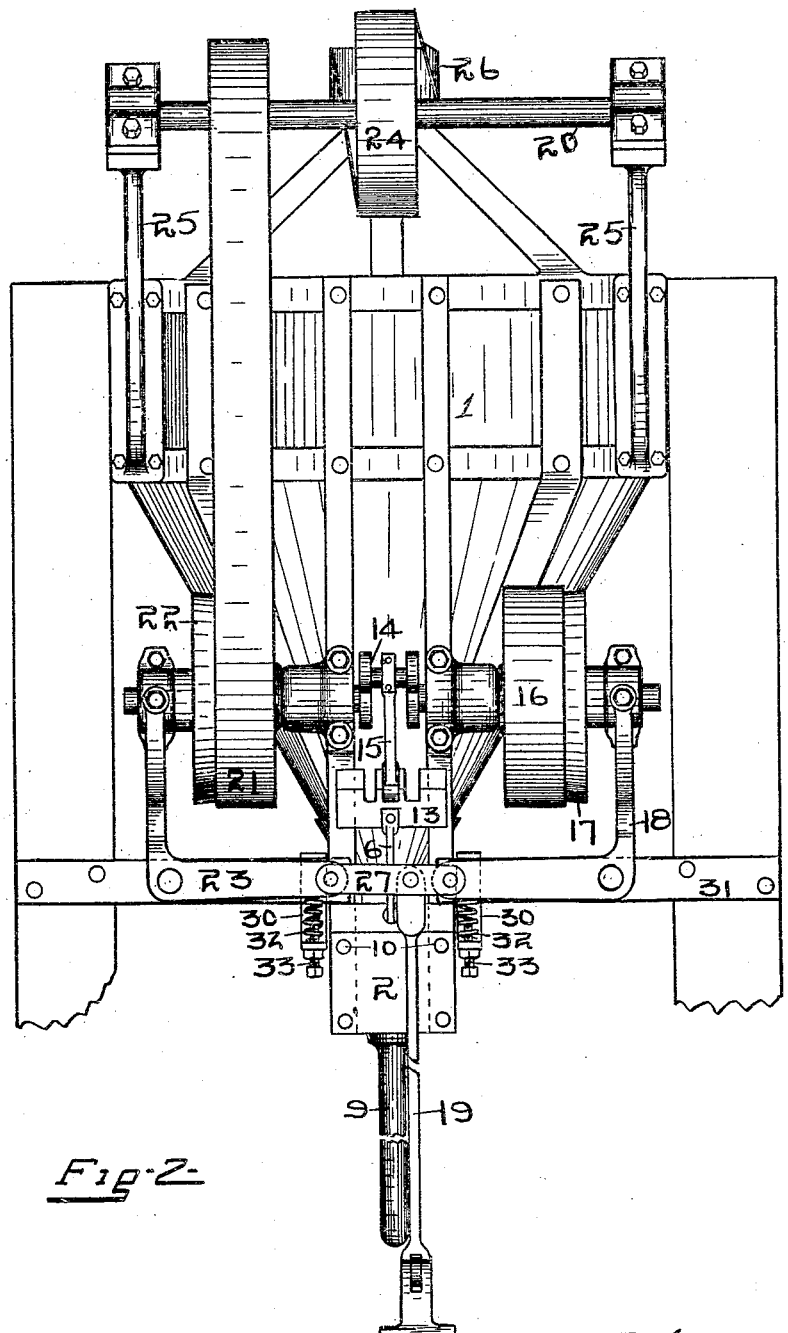

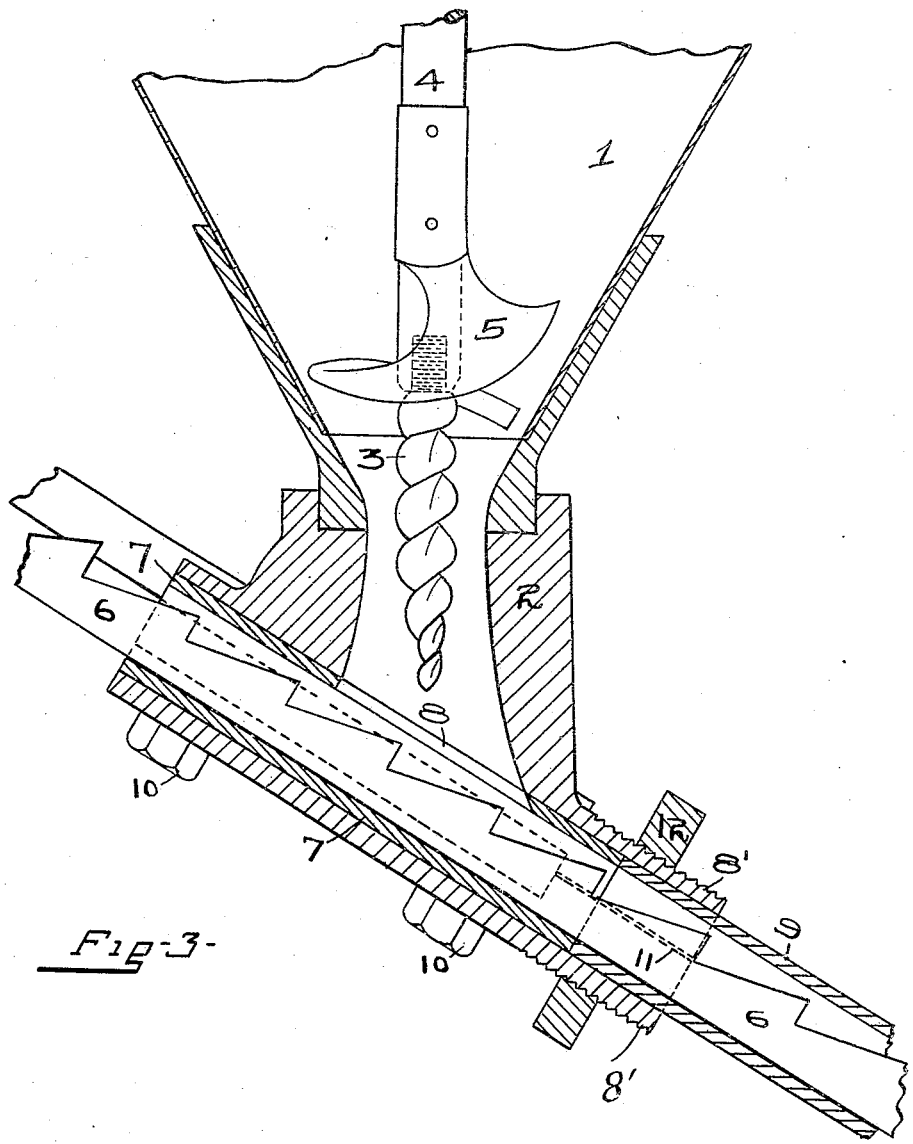

JOHN C. COLLETT, OF DAYTON, OHIO.

HORSE-COLLAR-STUFFING MACHINE.

No. 930,043.　　　Specification of Letters Patent.　　　Patented Aug. 3, 1909.

Application filed October 8, 1908. Serial No. 456,735.

*To all whom it may concern:*

Be it known that I, JOHN C. COLLETT, a citizen of the United States, residing at Dayton, in the county of Montgomery and State of Ohio, have invented certain new and useful Improvements in Horse-Collar-Stuffing Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in horse collar stuffing machines.

The object of the invention is to provide in one machine facilities for making different grades of collars.

Heretofore, a positive feed of short straw to a reciprocating feed rod through means of an auger has not been obtainable, but such results are obtainable through the means hereinafter described in connection with means for regulating the feed of straw by a foot lever.

Preceding a more detailed description of the invention, reference is made to the accompanying drawings, of which—

Figure 1, is a side elevation of the machine in its entirety. Fig. 2, is a rear elevation. Fig. 3, is an enlarged sectional view of the hopper and the auger and rod-feeding devices.

In a detail description of the invention, similar reference characters indicate corresponding parts.

The hopper 1 is suitably supported upon a frame-work and is designed to receive the straw to be fed to the collar; said hopper is joined to a head 2 in which an auger 3 is made to revolve, said auger being attached to a shaft 4 extended perpendicularly through the hopper; said auger lies within the throat of the head 2 and extends approximately to within a quarter of an inch of the feed rod. Attached to the shaft 4 above the auger, is a spiral blade 5 which acts upon the straw and forces it below to the auger, the latter during its rotation, delivering said straw to the feed rod 6 which reciprocates in the head 2 below the throat and the auger. In the head 2, there is an aperture below the throat and in which is placed a bushing 7, said bushing being open as at 8 so that the straw fed by the auger may come in contact with the reciprocating feed rod 6. This feed rod reciprocates within the bushing 7 and within a pipe 9 which is united to the head in alinement with the bushing through means of an extended portion 8' of the head which is exteriorly screw-threaded. By substituting bushings and pipe of smaller internal diameter, different size collars may be stuffed equally as well as larger sizes.

It will be understood that the head 2 is constructed in two parts, the base and the upper portion, said parts being united by bolts and nuts 10. The screw-threaded portion 8' of the head, is composed of the two parts of the head, and the pipe 9 is projected into said screw-threaded portion, and then a nut 12 is screwed onto said screw-threaded portion to clamp the pipe rigidly within said screw-threaded portion. The pipe 9, it will be understood, is projected into the horse collar (not shown) and the straw is forced through said pipe by the reciprocating feed rod 6 and is packed into the collar. The feed rod 6 is of well-known construction and is clearly illustrated and is attached at its upper end to a cross head 13. The cross head is operated from the crank 14 through a connecting rod 15.

In Fig. 2, the feed rod 6 is shown projected through the lower portion of the head 2 beneath the auger as in Fig. 3, and in this view, to-wit—Fig. 2, the pipe 9 is also shown extending from the head 2. The crank 14 which drives the feed rod 6, is driven from a main line shaft (not shown) through a friction wheel 16 which is engaged by a friction clutch 17 operated through a shifting lever 18, said shifting lever 18 being controlled through a foot lever 19 to be again referred to. The friction wheel 16 also drives a counter shaft 20 arranged above the hopper and through the medium of a friction wheel 21 and a clutch member 22 adapted to engage said friction wheel 21. The clutch member 22 is shifted by means of a lever 23 similar to the shifting lever 18. From the pulley 21 is driven a pulley 24 on the counter shaft 20, said counter shaft being journaled in brackets 25 which are fixed to the frame-work of the machine. The pulley 24 is connected to a pulley 26 by means of a cross belt, and the latter pulley is on the upper end of the shaft 4 which supports the auger feed 3. The levers 18 and 23 are adapted to throw in and out the auger and rod feed, and these levers are connected with a foot treadle through the lever 19 hereinbefore referred to. The connecting rod or lever 19 at its upper end is attached to a toggle 27, the ends of which are loosely connected to the ends of the clutch-shifting levers 18 and 23.

It will be seen, the connection of the rod 19 with the toggle 27 is upon one side of the center of said toggle, so that there will be a two to one leverage of the levers 18 and 23. The feed rod is operated by the short end of the toggle, while the screw feed is operated by the long end; it being necessary that the rod feed shall begin before the auger feed, it thereby being impossible to clog the feed pipe 9. This important feature of the rod working independently of the auger, enables the operator to ram or pack the already-delivered straw more solidly in any desired part of the collar, such for example, as that portion of the collar lying under the hame tug where the greater pressure comes upon the collar. Then, by slightly depressing the foot treadle, the auger will resume feeding.

When the foot treadle engages the upper notch 28 in the lever bracket, the friction wheel 16 is caused to revolve, thus working the feed rod, and a further depression of the foot treadle causes it to engage the lower notch 29 to engage the clutch 22 to work the auger feed. The length of the auger from its shoulder is approximately three and a half to four inches.

30 designates two brackets which are arranged adjacent to both ends of the toggle lever 27, and are rigidly attached to a cross bar 31 to which the clutch levers 18 and 23 are pivoted. These brackets support screws 33 which pass through their lower ends, and springs 32 which surround said screws and engage the under sides of the shifting levers 18 and 23. These devices control the pressure on the friction wheels 16 and 22 as follows: When the wheel 16 is caused to revolve the crank 14 which throws the feed rod, the pressure is stopped by the adjustable right-hand screw 33 throwing all the pressure upon the other friction lever 23 and starting the auger feed. The chief feature of the screw and spring associated with the lever 23 is to serve as a safety stop; the spring working on the long end of the toggle 27 initially returns the lever 23 to its normal position, thus allowing the means for driving the feed rod 6 to continue working until all pressure due to the foot lever 19 is relieved, when the lever 18 is also returned to its normal position through its spring 32.

I claim:

1. In a horse collar stuffing machine, a head having an inclined bore, a hopper mounted in said head and communicating with said bore, a pipe connected with said head in a plane with the bore, a feed bar lying within said incline bore and the pipe, an auger mounted in the hopper, means for rotating the auger, means for reciprocating the feed bar, and means common to both the auger-rotating means, and the feed bar-reciprocating means whereby the movement of the auger and the movement of the feed bar are controlled.

2. In a horse-collar stuffing machine, a head having an incline bore, a hopper mounted in said head and communicating with said bore, a pipe connected with the head and providing a continuation of the bore, a feed bar movable within said bore, an auger mounted in the hopper and extending in proximity to the bore in the head, means for rotating said auger to feed the straw to the feed bar, said rotating means comprising among its members a clutch, means for reciprocating the feed bar to pack the straw fed thereto in a collar, said last-named means also comprising among its members a clutch, and means for controlling the two clutches, said clutch-controlling means being adapted to release the auger clutch in advance of the feeding bar clutch.

3. In a horse collar stuffing machine, a head having an incline bore, a hopper mounted in said head and communicating with said bore, a pipe joining the head and communicating with the incline bore therein, a feed bar lying within said bore and pipe, an auger within the hopper and extending in proximity to the bore in the head, means for rotating said auger, means for reciprocating the feed bar, and means for controlling the movement of the feed bar and auger whereby said feed bar is initially started and the auger is initially stopped.

In testimony whereof I affix my signature, in presence of two witnesses.

JOHN C. COLLETT.

Witnesses:
 CAROLYN M. THEOBALD,
 MATTHEW SIEBLER.